(12) United States Patent
Kulick et al.

(10) Patent No.: US 11,113,147 B2
(45) Date of Patent: *Sep. 7, 2021

(54) SYSTEM AND METHOD FOR DETECTION OF, PREVENTION OF, AND RECOVERY FROM SOFTWARE EXECUTION FAILURE

(71) Applicant: Rovi Guides, Inc., San Jose, CA (US)

(72) Inventors: Todd Kulick, Mountain View, CA (US); Igor Pichkov, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,462

(22) Filed: Oct. 1, 2020

(65) Prior Publication Data

US 2021/0117273 A1 Apr. 22, 2021

Related U.S. Application Data

(63) Continuation of application No. 16/019,234, filed on Jun. 26, 2018, now Pat. No. 10,831,605.

(Continued)

(51) Int. Cl.
*G06F 11/00* (2006.01)
*G06F 11/14* (2006.01)
(Continued)

(52) U.S. Cl.
CPC ............ *G06F 11/1417* (2013.01); *G06F 8/65* (2013.01); *G06F 11/366* (2013.01)

(58) Field of Classification Search
CPC ............... G06F 11/1417; G06F 11/366; G06F 11/0766; G06F 11/0778; G06F 11/0787; G06F 11/0793; G06F 11/0796; G06F 11/14; G06F 11/1402; G06F 11/1415; G06F 11/142; G06F 11/1423; G06F 11/1428; G06F 11/143; G06F 11/1433; G06F 11/1435; G06F 11/1438; G06F 11/1441; G06F 11/1443; G06F 11/3612; G06F 11/3636; G06F 8/65; G06F 8/656; G06F 21/57; G06F 21/572; G06F 21/575; G06F 21/577; G06F 9/44; G06F 9/445;
(Continued)

(56) References Cited

U.S. PATENT DOCUMENTS 7,165,098 B1  1/2007  Boyer et al.
7,490,268 B2  2/2009  Keromytis et al.
(Continued)

OTHER PUBLICATIONS

U.S. Appl. No. 62/663,762, filed Apr. 27, 2018.

*Primary Examiner* — Anthony J Amoroso
(74) *Attorney, Agent, or Firm* — Haley Guiliano LLP

(57) ABSTRACT

Systems and methods are disclosed herein for monitoring, detecting, and mitigating hardware and software failures. An error detection module monitors the execution of software processes and detects failures of the monitored processes. The error detection module may monitor reboot events and correlate reboot events with failures of the monitored software processes. If a monitored process fails, the error detection module may log the failure and its cause. If the same process has failed numerous times, causing the user device to experience a reboot loop, remedial action may be taken based on the cause of the failure.

20 Claims, 7 Drawing Sheets

Related U.S. Application Data

(60) Provisional application No. 62/663,762, filed on Apr. 27, 2018.

(51) Int. Cl.
*G06F 8/65* (2018.01)
*G06F 11/36* (2006.01)

(58) Field of Classification Search
CPC .............. G06F 9/44505; G06F 9/44521; G06F 9/44536; G06F 9/44552
See application file for complete search history.

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 9,842,017 B1* | 12/2017 | Zhang ................. G06F 11/3452 |
| 2002/0174430 A1 | 11/2002 | Ellis et al. |
| 2004/0103412 A1* | 5/2004 | Rao ........................... G06F 8/65 717/171 |
| 2005/0138111 A1* | 6/2005 | Aton ................... G06F 11/3476 709/201 |
| 2005/0251827 A1 | 11/2005 | Ellis et al. |
| 2010/0011243 A1 | 1/2010 | Locasto et al. |
| 2010/0293407 A1 | 11/2010 | Locasto et al. |
| 2012/0173859 A1* | 7/2012 | Wang .................... G06F 9/4401 713/2 |
| 2017/0192839 A1* | 7/2017 | Kurian ................ G06F 11/0772 |

* cited by examiner

# SYSTEM AND METHOD FOR DETECTION OF, PREVENTION OF, AND RECOVERY FROM SOFTWARE EXECUTION FAILURE

CROSS-REFERENCE TO RELATED APPLICATION

This application is a continuation of U.S. patent application Ser. No. 16/019,234, filed Jun. 26, 2018, which claims the benefit of U.S. Provisional Application No. 62/663,762, filed Apr. 27, 2018, which are hereby incorporated by reference herein in their entireties.

BACKGROUND

In the modern world of computing, user devices are commonly within the possession or control of their users, while the services provided by and the software installed on those devices are controlled and updated remotely by service providers. Common examples of this include set-top box devices and cellular phones.

Under such circumstances, certain classes of issues may arise, due to hardware failure, software error, or other reasons, that may temporarily prevent or, worse, permanently prevent, an ability to remotely service, control, or upgrade the device in question. When this occurs, the user device may provide only degraded functionality or it may completely fail to perform its intended functions.

SUMMARY

Accordingly, systems and methods are described herein for monitoring, detecting, and mitigating hardware and software failures. Specifically, an error detection module, implemented in software, firmware, or hardware of a user device, may monitor the execution of software processes and detect successful terminations and failures of the monitored processes. Additionally, the error detection module may monitor reboot events and correlate reboot events with failures of the monitored software processes. If a monitored process fails, the error detection module may log the failure and a reason for the failure. If the same process has failed numerous times, causing the user device to experience a reboot loop, remedial action may be taken based on the reason for the failure. This helps ensure that the user device does not enter a state in which it is completely unusable by the user, and allows for the user device to correct, or request assistance for, any serious errors.

In some aspects, the error detection module monitors execution of a software process on the user device. For example, the error detection module may communicate with a processor, memory module, or other component or components of the user device that may be used in the execution of the software process. The error detection module may intercept, or otherwise capture the content of, signals sent between different components of the user device. For example, a signal indicating the status of execution of a particular step of the software process may be intercepted by the error detection module. If the signal indicates an unsuccessful execution, the error detection module may record a failure of the software process.

The error detection module may detect a first reboot of the user device. For example, the error detection module may communicate with a power status indicator, a BIOS of the user device, a shutdown process, or a boot process. If the error detection module receives a signal that a shutdown or reboot is about to occur, or has just occurred, the error detection module may record the reboot event.

The error detection module may determine whether the first reboot was caused by a first failure of the monitored software process. For example, after a recorded reboot event, the error detection module may access and review recorded failures within a threshold period of time prior to the recorded reboot event. If a failure was recorded during the threshold period of time prior to the recorded reboot event, the error detection module may determine that the first reboot was caused by the failure.

In response to determining that the first reboot was caused by the first failure of the monitored software process, the error detection module may determine the cause of the first failure and increment a counter associated with the particular cause of the first failure. For example, the error detection module may retrieve, from data associated with the recorded failure, a particular step or method at which the monitored software process failed. Depending on the action attempted at the point of failure, the error detection module may determine a particular cause for the failure. For example, the point of failure may be a step to request data from a server. The failure may occur due to an inability to establish a connection with the server. The error detection module may determine that a lack of network connectivity is the cause of the failure. The error detection module may then increment a counter associated with failure due to lack of network connectivity.

Similar to the above, the error detection module may detect, within a threshold period of time of the first reboot, a second reboot of the user device and determine whether the second reboot was caused by a second failure of the monitored software process and may determine a cause of the second failure. The error detection module may then determine whether the cause of the second failure is the same as the cause of the first failure. For example, the error detection module may compare the cause of the first failure with the cause of the second failure.

In response to determining that the cause of the second failure is the same as the cause of the first failure, the error detection module may increment the counter and compare the counter to a failure threshold. If the counter exceeds the failure threshold, the error detection module may determine that the user device is experiencing a reboot loop. For example, the counter may have a value of six, and the threshold may be five. The error detection module may therefore determine that the user device is experiencing a reboot loop.

In response to determining that the user device is experiencing a reboot loop, the error detection module may determine, based on the cause of the second failure, a remedial action, and may perform the remedial action. For example, if the cause of the failure is a lack of network connectivity, the error detection module may determine to skip the step of the software process that requires a network connection.

In some embodiments, the error detection module may determine the cause of the second failure by determining that a prerequisite process has not been completed, and may determine the remedial action by determining to slow a speed at which the software process is executed to allow the prerequisite process to complete prior to execution of the software process.

In some embodiments, the second failure prevents the execution of a subsequent process. The error detection module may determine that the counter exceeds a low-failure threshold, such as three failures, and prevent execution of the software process in order to allow the subsequent process to be executed. The error detection module may determine that the counter exceeds both the low-failure threshold and a high-failure threshold, such as ten failures, and may transmit, to a server, a request for assistance.

In some embodiments, the remedial action comprises determining to execute a limited boot process. For example, the error detection module may instruct the user device to boot with only a minimum level of functionality, such as a "safe mode" environment. This prevents the normal boot processes, which may include the failing software process. The error detection module may transmit, to a server, a request for a software update.

In some embodiments, the error detection module may monitor execution of the software process by monitoring a plurality of steps of the software process. For example, a software process may be comprised of several steps, each step performing a function of the overall process. A failure at one step may cause the entire process to fail. The error detection module may determine the cause of the second failure by detecting the second failure at a first step. For example, the first and second failures may occur at the same step of the software process. The error detection module may determine the remedial action by determining to begin the software process at a second step that follows the first step. For example, if the step at which the failure occurred involved performing a particular function, or accessing a particular software, hardware, or memory asset, the error detection module may instruct the user device to begin the software process at a step following the step at which the failure occurred in order to prevent the failure and allow the software process to complete successfully. Similar to the above, in some embodiments, the software process may be a virtual process encompassing a plurality of software processes.

In some embodiments, the software process processes a data file received from a server. For example, the user device may request and/or receive a file from a server. The error detection module may determine the cause of the failure by determining that the data file cannot be processed by the software process. For example, the error detection module may determine that the data file does not conform to a required set of parameters. The error detection module may determine the remedial action by determining to prevent the software process from processing the data file and transmit, to the server, a message indicating that the data file could not be processed.

In some embodiments, the error detection module may determine the cause of the first failure by determining a point during the software process at which the first failure occurred. For example, the error detection module may record a status signal at the completion of each step of the software process. If a failure occurs at a particular step, the error detection module may access the recorded statuses to determine at which step the failure occurred. The error detection module may determine an action to be taken at the point during the software process at which the first failure occurred. For example, at the step at which the failure occurred, the user device may attempt to connect to a server. The error detection module may determine, based on the action, that the cause of the first failure is associated with the action. For example, the error detection module may determine, based on the failure having occurred during an attempt to connect to a server, that the user device may not have a functional network connection, and may instruct the user device not to perform any steps, functions, or processes which require network connectivity. The error detection module may further generate for display a message to the user to check a network connection of the user device.

In some embodiments, the software process stores status information related to the execution and failure of the software process in a data structure. For example, the software process may record statuses from each step of the software process and store them in a list file, data file, database, or other data structure. Alternatively or additionally, the software process may report such statuses to the error detection module, which may in turn store the statuses. The error detection module may determine the cause of the first failure by determining a time at which the first failure occurred, accessing the data structure, determining status information having a timestamp at or near the determined time at which the failure occurred, and determining, based on the status information, the cause of the first failure. For example, the error detection module may access a list, database, or other data structure containing a record of failures and associated timestamps indicating a time at which each failure occurred. The error detection module may also access the data structure in which are recorded the status signals from each process, and which may also record a timestamp associated with each signal. The error detection module may compare the timestamp of the most recent failure with the timestamps of recent status signals indicating unsuccessful processes to determine which process may have been the cause of the failure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for monitoring, detecting, and mitigating hardware and software failures.

Specifically, an error detection module, implemented in software, firmware, or hardware of a user device, may monitor the execution of software processes and detect successful terminations and failures of the monitored processes. Additionally, the error detection module may monitor reboot events and correlate reboot events with failures of the monitored software processes. If a monitored process fails, the error detection module may log the failure and a reason for the failure. If the same process has failed numerous times, causing the user device to experience a reboot loop, remedial action may be taken based on the reason for the failure. This helps ensure that the user device does not enter a state in which it is completely unusable by the user, and allows for the user device to correct, or request assistance for, any serious errors.

For example, a user device may execute a software process that acts on, or through, a hardware or software component that does not function properly, or a memory asset (e.g., a data file or database) that is missing, corrupt, or improperly formatted. Such malfunctions and erroneous data may cause the software process to fail. For example, the process may continue and return an improper result, or the process may terminate prematurely. The user device may be configured to reboot after such failures in an automated attempt to correct the problem. Thus, either of the above conditions may cause the user device to reboot. The software process may be configured to report its status upon completion or upon termination. Alternatively, or additionally, the software process may be configured to report its status at a number of steps of the process. The error detection module may request, receive, or otherwise detect these status reports in order to detect when an error has occurred. The error detection module may also detect and record reboot events. If an error occurs at or just before the time of a recorded reboot event, the error detection module may determine that the reboot was caused by the error.

Figure 1:
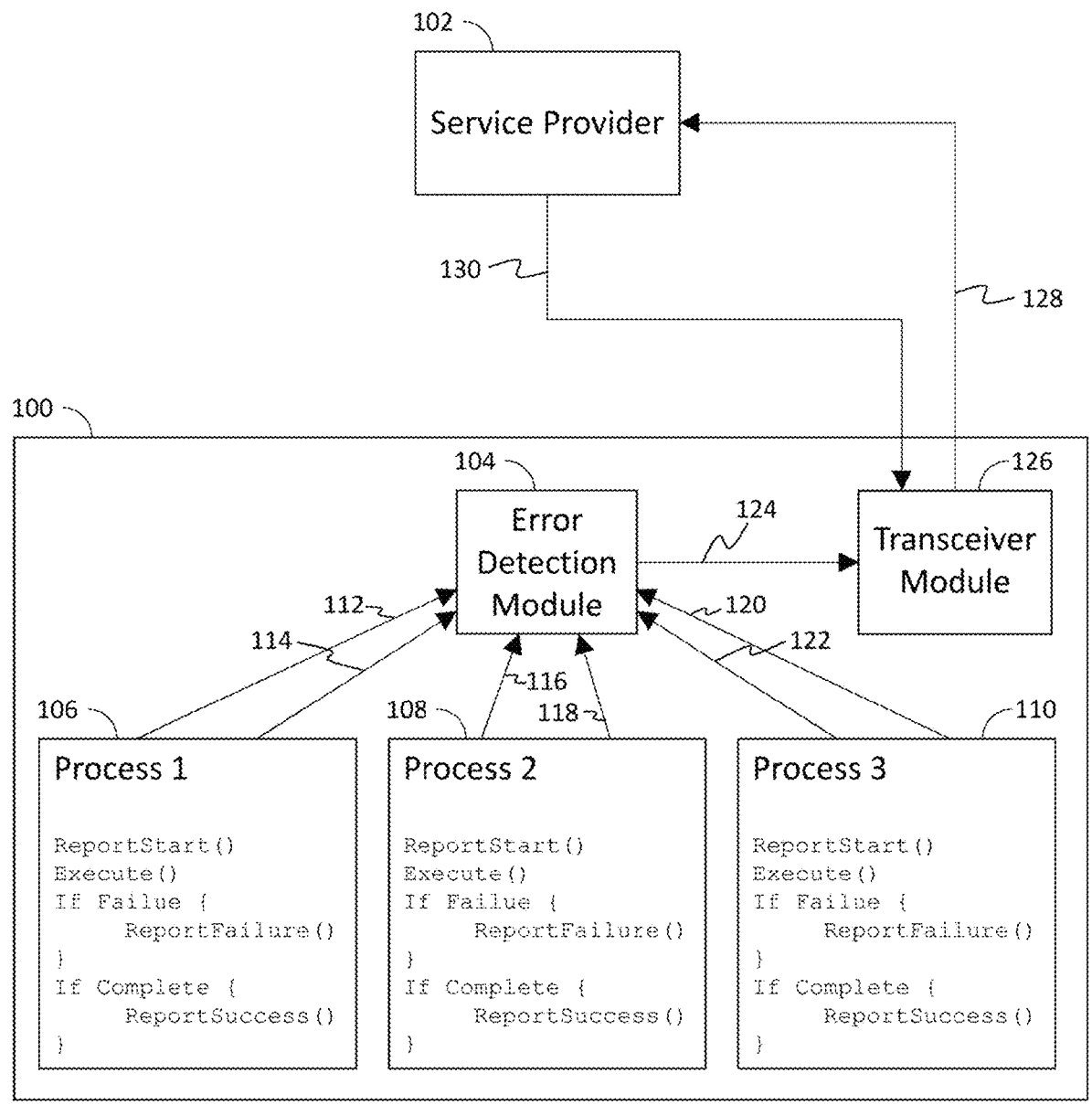
FIG. 1 is a block diagram representing an error detection architecture in accordance with some embodiments of the disclosure.

FIG. 1 is a block diagram representing an error detection architecture in accordance with some embodiments of the disclosure. User device 100 may be provided, served and/or administered by service provider 102. Thus, a user of user device 100 may not be capable of curing software, firmware, or hardware errors of the user device 100. Error detection module 104, which may be implemented in software, firmware, or hardware, may be employed to determine when an error has occurred and what action to take in order to prevent and/or cure the problem that caused the error. User device 100 may execute a number of software processes, such as processes 106, 108, and 110. Error detection module 104 may monitor each of software processes 106, 108, and 110. Error detection module 104 may receive, from each process, a report of both the start (e.g., report 112) and completion (e.g., report 114) of the process. A completion report (e.g., report 114) may be received by the error detection module 104 after either a successful completion or a failure of the software process (e.g., process 106). A report of failure may include a reason for the failure. If necessary, based on the reason for failure, the error detection module 104 may issue a request 124 and, using transceiver module 126, transmit 128 the request to service provider 102. The error detection module 104 may receive, from service provider 102, a response 130. The response 130 may include a software update, a data file, or any other data requested by the error detection module 104 or determined by service provider 102 to be necessary to correct the reason for the reported failure.

The error detection module 104 may be configured to monitor execution of a software process on the user device 100. For example, the error detection module 104 may communicate with a processor, memory module, or other component or components of the user device 100 that may be used in the execution of the software process (e.g., software process 106). The error detection module 104 may intercept, or otherwise capture the content of, signals sent between different components of the user device 100. For example, error detection module 104 may intercept a signal indicating the status of execution of a particular step of the software process 106. If the signal indicates an unsuccessful execution, the error detection module 104 may record a failure of the software process 106. The signal may be generated by software and comprise a data packet, or may be generated by firmware or hardware and comprise a change in voltage or other electrical pulse input to a particular hardware component.

The error detection module 104 may be configured to detect a first reboot of the user device 100. For example, the error detection module 104 may communicate with a power status indicator, a BIOS of the user device 100, a shutdown process, or a boot process. Alternatively, or additionally, error detection module 104 may receive a report of status information from a shutdown process or a boot process of the user device 100. If the error detection module 104 receives a signal that a shutdown or reboot is about to occur, or has just occurred, the error detection module 104 may record the reboot event.

The error detection module 104 may be configured to determine whether the first reboot was caused by a first failure of the monitored software process (e.g., software process 106). For example, after a recorded reboot event, the error detection module 104 may access and review recorded failures within a threshold period of time prior to the recorded reboot event. For example, software process 106 may encounter an error at 10:30 AM. The error detection module may record the error and a timestamp representing 10:30 AM. The error encountered by the software process 106 may cause the user device 100 to reboot at 10:32 AM. The error detection module may record the reboot event and a timestamp representing 10:32 AM. During the next boot cycle after the reboot event, the error detection module 104 may compare the timestamp of the reboot event, which represents 10:32 AM, with the timestamps of any errors in, for example, a five-minute time period prior to 10:32 AM. The error detection module 104 may find the recorded error encountered by software process 106 at 10:30 AM, which falls within the five-minute time period. If a failure was recorded during the threshold period of time prior to the recorded reboot event, the error detection module 104 may determine that the first reboot was caused by the failure. For example, the error detection module 104 may determine that the error encountered by software process 106 at 10:30 AM was the cause of the 10:32 AM reboot event.

In response to determining that the first reboot was caused by the first failure of the monitored software process 106, the error detection module 104 may be configured to determine the cause of the first failure and increment a counter associated with the particular cause of the first failure. For example, the error detection module 104 may retrieve, from data associated with the recorded failure, a particular step or method at which the monitored software process 106 failed. Depending on the action attempted at the point of failure, the error detection module 104 may determine a particular cause for the failure. For example, the point of failure may be a step to request data from a server. The failure may occur due to an inability to establish a connection with the server. The error detection module 104 may determine that a lack of network connectivity is the cause of the failure. The error detection module 104 may then increment a counter associated with failure due to lack of network connectivity. Alternatively, the software process 106 may report a cause (using text, error code, or any other suitable means) of the failure. In some embodiments, the counter or counters are reset after a complete and error-free boot process. In some embodiments, the counter or counters are maintained until a remedial action that cures the cause associated with a particular counter is completed, at which point the particular counter is reset.

Similar to the above, the error detection module 104 may be configured to detect, within a threshold period of time of the first reboot, a second reboot of the user device 100 and to determine whether the second reboot was caused by a second failure of the monitored software process 106. The error detection module 104 may further be configured to determine a cause of the second failure. The error detection module 104 may then determine whether the cause of the second failure is the same as the cause of the first failure. For example, the error detection module 104 may compare the cause of the first failure with the cause of the second failure.

In response to determining that the cause of the second failure is the same as the cause of the first failure, the error detection module 104 may increment the counter and compare the counter to a failure threshold. If the counter exceeds the failure threshold, the error detection module 104 may determine that the user device 100 is experiencing a reboot loop. For example, the counter may have a value of six, and the threshold may be five. The error detection module 104 may therefore determine that the software process 106 has encountered the same error an unacceptably high number of times in a row, causing the user device 100 to experience a reboot loop.

In response to determining that the user device 100 is experiencing a reboot loop, the error detection module 104 may determine, based on the cause of the second failure, a remedial action, and may perform the remedial action. For example, if the cause of the failure is a lack of network connectivity, the error detection module 104 may determine to skip the step of the software process 106 that requires a network connection.

In some embodiments, the error detection module 104 may be configured to determine the cause of the second failure by determining that a prerequisite process (e.g., software process 108) has not been completed, and may determine the remedial action by determining to slow a speed at which the software process 106 is executed to allow the prerequisite process 108 to complete prior to execution of the software process 106.

In some embodiments, the second failure prevents the execution of a subsequent process (e.g., software process 110). The error detection module 104 may be configured to determine that the counter exceeds a low-failure threshold, such as three failures, and prevent execution of the software process 106 in order to allow the subsequent process 110 to be executed. The error detection module 104 may determine that the counter exceeds both the low-failure threshold and a high-failure threshold, such as ten failures, and may transmit, via a transceiver module 126, to a server 102, a request for assistance 128.

In some embodiments, the remedial action comprises determining to execute a limited boot process. For example, the error detection module 104 may instruct the user device 100 to boot with only a minimum level of functionality, such as a "safe mode" environment. This prevents the normal boot processes, which may include the failing software process. The error detection module 104 may transmit, using transceiver module 126, to a server 102, a request for a software update 128.

In some embodiments, the error detection module 104 may be configured to monitor execution of the software process 106 by monitoring a plurality of steps of the software process 106. For example, software process 106 may be comprised of several steps, each step performing a function of the overall process. A failure at one step may cause the entire process to fail. The error detection module 104 may be configured to determine the cause of the second failure by detecting the second failure at a first step. For example, the first and second failures may occur at the same step of the software process 106. The error detection module 104 may determine the remedial action by determining to begin the software process 106 at a second step that follows the first step. For example, if the step at which the failure occurred involved performing a particular function, or accessing a particular software, hardware, or memory asset, the error detection module 104 may instruct the user device 100 to begin the software process 106 at a step following the step at which the failure occurred in order to prevent the failure and allow the software process 106 to complete successfully. Similar to the above, in some embodiments, the software process 106 is a virtual process encompassing a plurality of software processes.

In some embodiments, the software process 106 processes a data file received from a server, such as service provider 102. For example, the user device 100 may request and/or receive a file from service provider 102. The error detection module 104 may be configured to determine the cause of the failure by determining that the data file cannot be processed by the software process 106. For example, the error detection module 104 may determine that the data file does not conform to a required set of parameters. The error detection module 104 may be configured to determine the remedial action by determining to prevent the software process 106 from processing the data file and transmit, to the server (e.g., service provider 102), a message 126 indicating that the data file could not be processed.

In some embodiments, the error detection module 104 may be configured to determine the cause of the first failure by determining a point during the software process 106 at which the first failure occurred. For example, the error detection module 104 may record a status signal at the completion of each step of the software process 106. If a failure occurs at a particular step, the error detection module 104 may access the recorded statuses to determine at which step the failure occurred. The error detection module 104 may determine an action to be taken at the point during the software process 106 at which the first failure occurred. For example, at the step at which the failure occurred, the user device 100 may attempt to connect to a server. The error detection module 104 may be configured to determine, based on the action, that the cause of the first failure is associated with the action. For example, the error detection module 104 may determine, based on the failure having occurred during an attempt to connect to a server, that the user device 100 may not have a functional network connection, and may instruct the user device 100 not to perform any steps, functions, or processes which require network connectivity. The error detection module 104 may further generate for display a message to the user to check a network connection of the user device 100.

In some embodiments, the software process 106 stores status information related to the execution and failure of the software process 106 in a data structure. For example, the software process 106 may record statuses from each step of the software process 106 and store them in a list file, data file, database, or other data structure. Alternatively or additionally, error detection module 104 may receive status reports from the software process 106, and error detection module 104 may in turn store the statuses. The error detection module 104 may determine the cause of the first failure by determining a time at which the first failure occurred, accessing the data structure, determining status information having a timestamp at or near the determined time at which the failure occurred, and determining, based on the status information, the cause of the first failure. For example, the error detection module 104 may access a list, database, or other data structure containing a record of failures and associated timestamps indicating a time at which each failure occurred. The error detection module 104 may also access the data structure in which are recorded the status signals from each process, and which may also record a timestamp associated with each signal. The error detection module 104 may compare the timestamp of the most recent failure with the timestamps of recent status signals indicating unsuccessful processes to determine which process may have been the cause of the failure.

In some embodiments, the user device 100 may be a media device, and service provider 102 may be a media content delivery system. Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2:
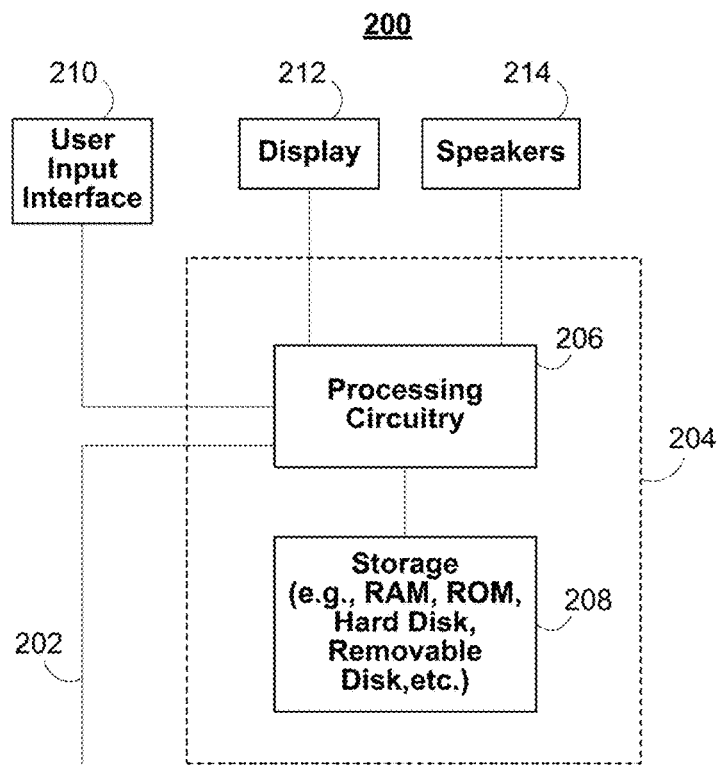
FIG. 2 shows a generalized embodiment of a stand-alone device in accordance with some embodiments of the disclosure.

Users may access content and the media guidance application (and its display screens described above and below) from one or more of their user equipment devices. FIG. 2 shows a generalized embodiment of illustrative user equipment device 200. More specific implementations of user equipment devices are discussed below in connection with FIG. 3. User equipment device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media guidance application stored in memory (i.e., storage 208). Specifically, control circuitry 204 may be instructed by the media guidance application to perform the functions discussed above and below. For example, the media guidance application may provide instructions to control circuitry 204 to generate the media guidance displays. In some implementations, any action performed by control circuitry 204 may be based on instructions received from the media guidance application.

In client-server based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of user equipment device 200. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive media guidance application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

The guidance application may be implemented using any suitable architecture. For example, it may be a stand-alone application wholly-implemented on user equipment device 200. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the media guidance application is a client-server based application. Data for use by a thick or thin client implemented on user equipment device 200 is retrieved on-demand by issuing requests to a server remote to the user equipment device 200. In one example of a client-server based guidance application, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

In some embodiments, the media guidance application is downloaded and interpreted or otherwise run by an interpreter or virtual machine (run by control circuitry 204). In some embodiments, the guidance application may be encoded in the ETV Binary Interchange Format (EBIF), received by control circuitry 204 as part of a suitable feed, and interpreted by a user agent running on control circuitry 204. For example, the guidance application may be an EBIF application. In some embodiments, the guidance application may be defined by a series of JAVA-based files that are received and run by a local virtual machine or other suitable middleware executed by control circuitry 204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 3:
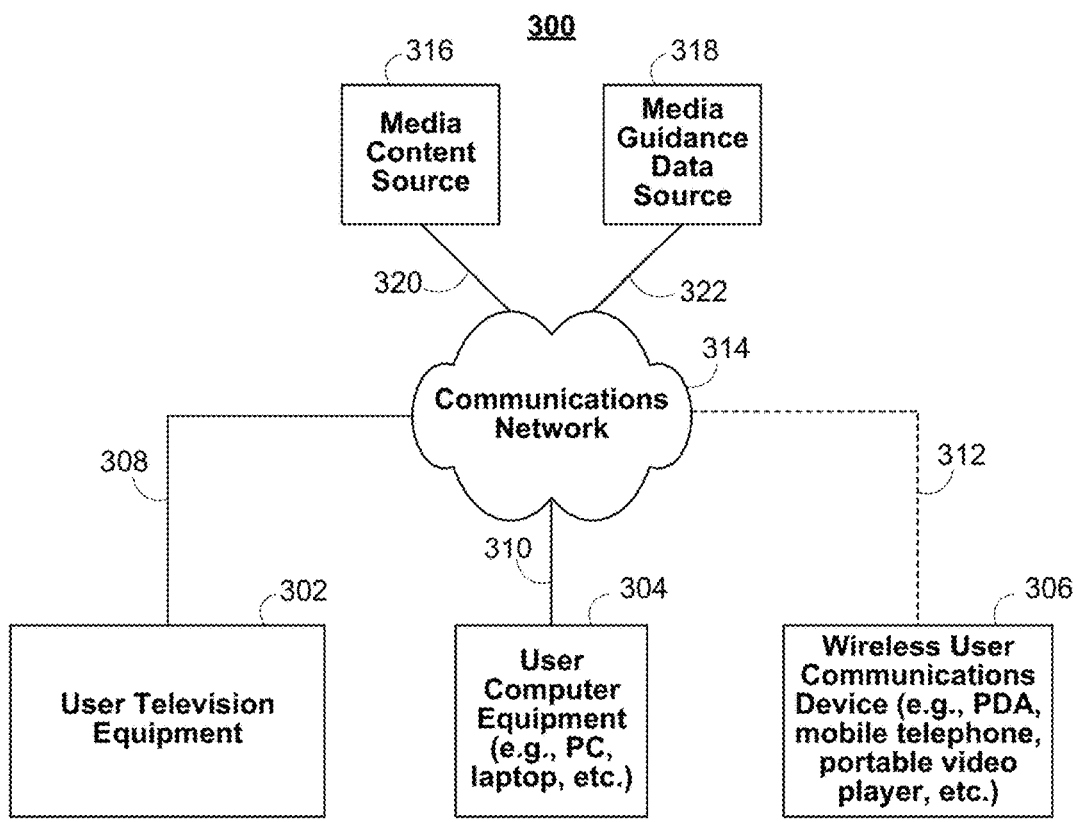
FIG. 3 shows a specific implementation of user devices in accordance with some embodiments of the disclosure.

User equipment device 200 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The media guidance application may have the same layout on various different types of user equipment or may be tailored to the display capabilities of the user equipment. For example, on user computer equipment 304, the guidance application may be provided as a web site accessed by a web browser. In another example, the guidance application may be scaled down for wireless user communications devices 306.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance data source 318 may be exchanged over one or more communications paths, but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources are discussed below.) If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 318 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 318 may provide user equipment devices 302, 304, and 306 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 208, and executed by control circuitry 204 of a user equipment device 200. In some embodiments, media guidance applications may be client-server applications where only a client application resides on the user equipment device, and server application resides on a remote server. For example, media guidance applications may be implemented partially as a client application on control circuitry 204 of user equipment device 200 and partially on a remote server as a server application (e.g., media guidance data source 318) running on control circuitry of the remote server. When executed by control circuitry of the remote server (such as media guidance data source 318), the media guidance application may instruct the control circuitry to generate the guidance application displays and transmit the generated displays to the user equipment devices. The server application may instruct the control circuitry of the media guidance data source 318 to transmit data for storage on the user equipment. The client application may instruct control circuitry of the receiving user equipment to generate the guidance application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 316 to access content. Specifically, within a home, users of user television equipment 302 and user computer equipment 304 may access the media guidance application to navigate among and locate desirable content. Users may also access the media guidance application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 304 or wireless user communications device 306 having content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 4:
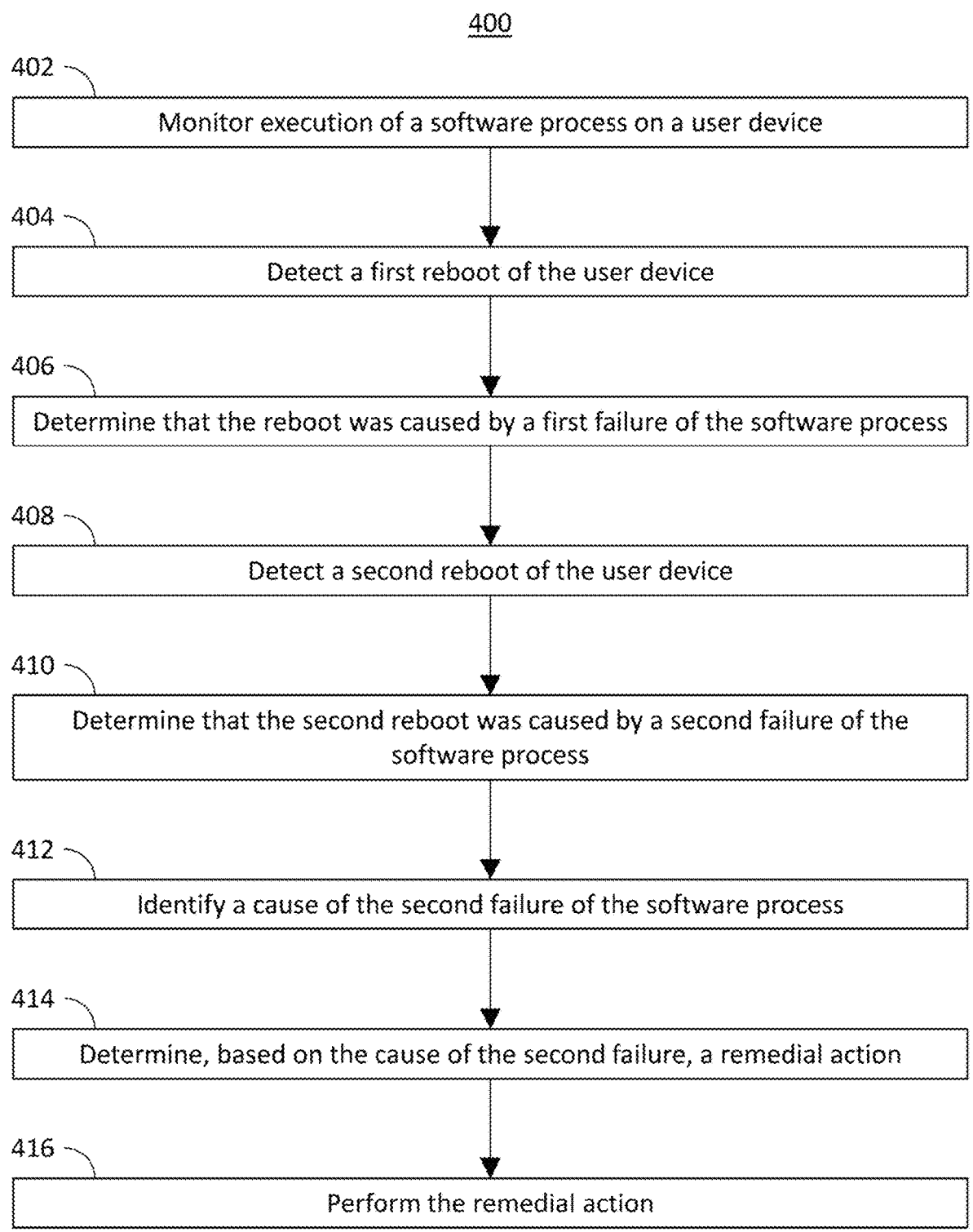
FIG. 4 is a flowchart representing a process for handling software execution failures in accordance with some embodiments of the disclosure.

FIG. 4 is a flowchart representing an illustrative process for handling software execution failures in accordance with some embodiments of the disclosure. The flowchart in FIG. 4 represents a process 400 implemented on control circuitry 204 for handling software execution failures according to an embodiment of the disclosure. It should be noted that process 400 or any action thereof could be performed on, or provided by, any of the devices shown in FIGS. 2-3. For example, process 400 may be executed by control circuitry 204 (FIG. 2) as instructed by a media guidance application implemented on a server (e.g., media content source 316 and/or media guidance data source 318 (FIG. 3)) in order to handle software execution failures. In addition, one or more actions of process 400 may be incorporated into or combined with one or more actions of any other process or embodiment described herein.

At 402, control circuitry 204, which may include error detection module 104, may be configured to monitor execution of a software process. For example, control circuitry 204 may communicate with a processor, memory module, or other component or components of a user device (e.g., user device 100, user equipment device 200, or any of user equipment devices 302, 304, and 306) that may be used in the execution of the software process (e.g., software process 106). Control circuitry 204 may intercept, or otherwise capture the content of, signals sent between different components of the user device 100. For example, control circuitry 204 may intercept a signal indicating the status of execution of a particular step of the software process 106. If the signal indicates an unsuccessful execution, control circuitry 204 may record a failure of the software process 106. The signal may be generated by software and comprise a data packet, or may be generated by firmware or hardware and comprise a change in voltage or other electrical pulse input to a particular hardware component.

At 404, control circuitry 204 may be configured to detect a reboot of the user device 100. For example, control circuitry 204 may communicate with a power status indicator, a BIOS of the user device 100, a shutdown process, or a boot process. Alternatively, or additionally, a shutdown process or a boot process of the user device 100 may be configured to report status information to control circuitry 204. If control circuitry 204 receives a signal that a shutdown or reboot is about to occur, or has just occurred, control circuitry 204 may record the reboot event.

At 406, control circuitry 204 may be configured to determine whether the first reboot was caused by a first failure of the monitored software process (e.g., software process 106). For example, after a recorded reboot event, control circuitry 204 may access and review recorded failures within a threshold period of time prior to the recorded reboot event. For example, software process 106 may encounter an error at 10:30 AM. Control circuitry 204 may record the error and a timestamp representing 10:30 AM. The error encountered by the software process 106 may cause the user device 100 to reboot at 10:32 AM. Control circuitry 204 may record the reboot event and a timestamp representing 10:32 AM. During the next boot cycle after the reboot event, control circuitry 204 may compare the timestamp of the reboot event, which represents 10:32 AM, with the timestamps of any errors in, for example, a five-minute time period prior to 10:32 AM. Control circuitry 204 may find the recorded error encountered by software process 106 at 10:30 AM, which falls within the five-minute time period. If a failure was recorded during the threshold period of time prior to the recorded reboot event, control circuitry 204 may determine that the first reboot was caused by the failure. For example, control circuitry 204 may determine that the error encountered by software process 106 at 10:30 AM was the cause of the 10:32 AM reboot event.

At 408, control circuitry 204 may be configured to detect a second reboot of the user device 100. This may be accomplished using methods similar to those described above with regard to detecting the first reboot of the user device 100.

At 410, control circuitry 204 may be configured to determine that the second reboot was caused by a second failure of the software process 106. This may be accomplished using methods similar to those described above with regard to determining that the first reboot was caused by the first failure of the software process 106.

At 412, control circuitry 204 may be configured to identify a cause of the second failure of the software process 106. For example, control circuitry 204 may retrieve, from data associated with the recorded failure, a particular step or method at which the monitored software process 106 failed. Depending on the action attempted at the point of failure, control circuitry 204 may determine a particular cause for the failure. For example, the point of failure may be a step to request data from a server. The failure may occur due to an inability to establish a connection with the server. Control circuitry 204 may determine that a lack of network connectivity is the cause of the failure. Alternatively, the software process 106 may report a cause (using text, error code, or any other suitable means) of the failure.

At 414, control circuitry 204 may be configured to determine, based on the cause of the second failure, a remedial action. For example, if the cause of the failure is a lack of network connectivity, control circuitry 204 may determine to skip the step of the software process 106 that requires a network connection.

At 416, control circuitry 204 may be configured to perform the remedial action. For example, control circuitry 204 may instruct user device 100 to skip the step of software process 106 that requires a network connection.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-3 could be used to perform one or more of the actions in FIG. 4.

Figure 5:
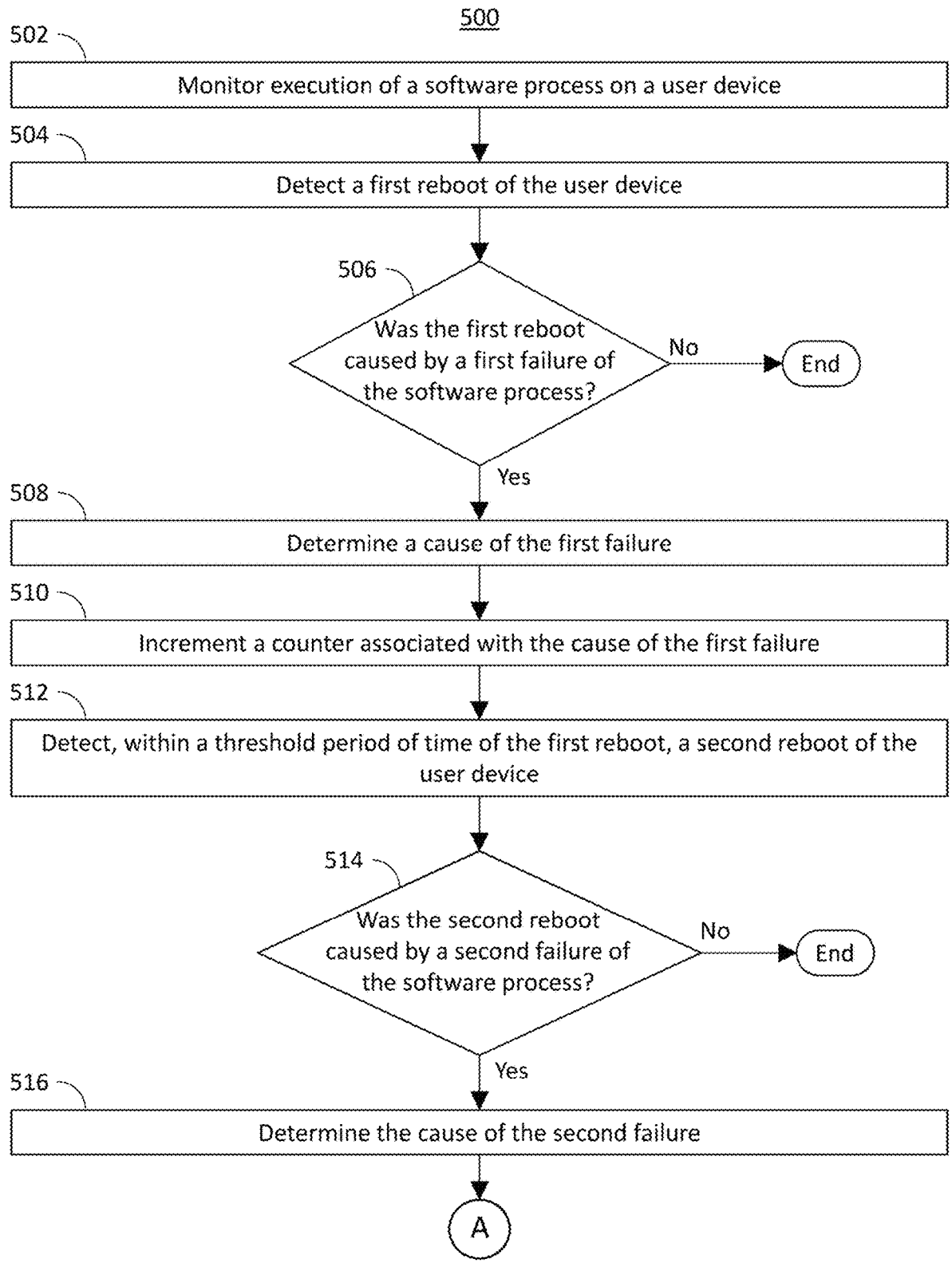
FIG. 5 is a flowchart representing another process for handling software execution failures by tracking a number of failures having a given cause in accordance with some embodiments of the disclosure.
Figure 5:
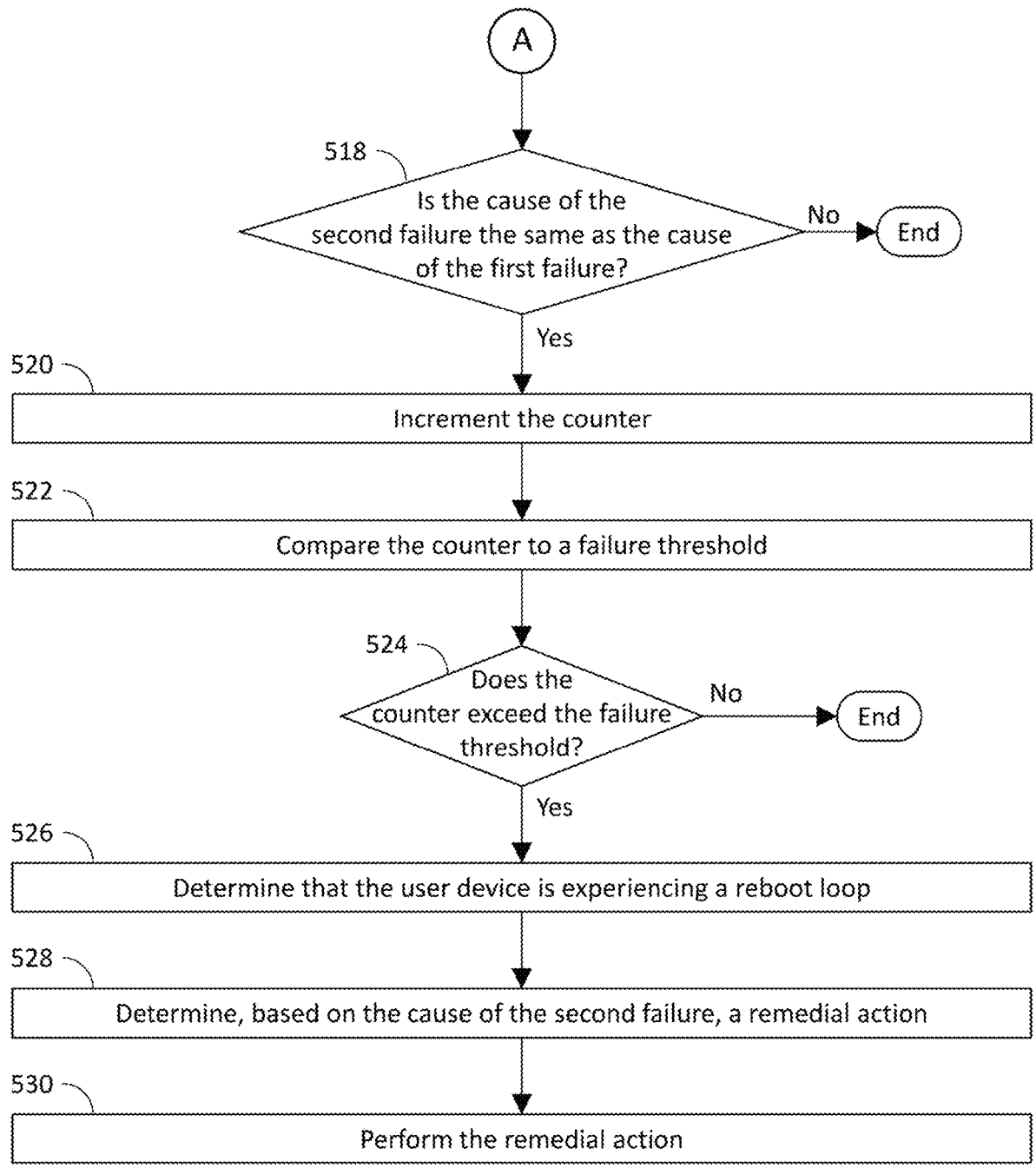

FIG. 5 is a flowchart representing an illustrative process for handling software execution failures by tracking a number of failures having a given cause in accordance with some embodiments of the disclosure. The flowchart in FIG. 5 represents a process 500 implemented on control circuitry 204 for handling software execution failures by tracking a number of failures having a given cause according to an embodiment of the disclosure. It should be noted that process 500 or any action thereof could be performed on, or provided by, any of the devices shown in FIGS. 2-3. For example, process 400 may be executed by control circuitry 204 (FIG. 2) as instructed by a media guidance application implemented on a server (e.g., media content source 316 and/or media guidance data source 318 (FIG. 3)) in order to handle software execution failures by tracking a number of failures having a given cause. In addition, one or more actions of process 400 may be incorporated into or combined with one or more actions of any other process or embodiment described herein.

At 502, control circuitry 204 may be configured to monitor execution of a software process (e.g., software process 106) on a user device (e.g., user device 100, user equipment device 200, or any of user equipment devices 302, 304, and 306). For example, control circuitry 204 may communicate with a processor, memory module, or other component or components of a user device (e.g., user device 100, user equipment device 200, or any of user equipment devices 302, 304, and 306) that may be used in the execution of the software process (e.g., software process 106). Control circuitry 204 may intercept, or otherwise capture the content of, signals sent between different components of the user device 100. For example, a signal indicating the status of execution of a particular step of the software process 106 may be intercepted by control circuitry 204. If the signal indicates an unsuccessful execution, control circuitry 204 may record a failure of the software process 106. The signal may be generated by software and comprise a data packet, or may be generated by firmware or hardware and comprise a change in voltage or other electrical pulse input to a particular hardware component.

At 504, control circuitry 204 may be configured to detect a first reboot of the user device 100. For example, control circuitry 204 may communicate with a power status indicator, a BIOS of the user device 100, a shutdown process, or a boot process. Alternatively, or additionally, control circuitry 204 may receive a report of status information from a shutdown process or a boot process of the user device 100. If control circuitry 204 receives a signal that a shutdown or reboot is about to occur, or has just occurred, control circuitry 204 may record the reboot event.

At 506, control circuitry 204 may be configured to determine whether the first reboot was caused by a first failure of the software process 106. For example, after a recorded reboot event, control circuitry 204 may access and review recorded failures within a threshold period of time prior to the recorded reboot event. For example, software process 106 may encounter an error at 10:30 AM. Control circuitry 204 may record the error and a timestamp representing 10:30 AM. The error encountered by the software process 106 may cause the user device 100 to reboot at 10:32 AM. Control circuitry 204 may record the reboot event and a timestamp representing 10:32 AM. During the next boot cycle after the reboot event, control circuitry 204 may compare the timestamp of the reboot event, which represents 10:32 AM, with the timestamps of any errors in, for example, a five-minute time period prior to 10:32 AM. Control circuitry 204 may find the recorded error encountered by software process 106 at 10:30 AM, which falls within the five-minute time period. If a failure was recorded during the threshold period of time prior to the recorded reboot event, control circuitry 204 may determine that the first reboot was caused by the failure. For example, control circuitry 204 may determine that the error encountered by software process 106 at 10:30 AM was the cause of the 10:32 AM reboot event.

If control circuitry 204 determines that the first reboot was caused by the first failure of software process 106, control circuitry 204 may be configured to determine the cause of the first failure. For example, control circuitry 204 may retrieve, from data associated with the recorded failure, a particular step or method at which the monitored software process 106 failed. Depending on the action attempted at the point of failure, control circuitry 204 may determine a particular cause for the failure. For example, the point of failure may be a step to request data from a server. The failure may occur due to an inability to establish a connection with the server. Control circuitry 204 may determine that a lack of network connectivity is the cause of the failure. Alternatively, the software process 106 may report a cause (using text, error code, or any other suitable means) of the failure.

At 510, control circuitry 204 may be configured to increment a counter associated with the cause of the first failure. For example, if control circuitry 204 determines that a lack of network connectivity is the cause of the failure, control circuitry 204 may increment a counter associated with failure due to lack of network connectivity. In some embodiments, more than one counter may be initialized if, after each failure, a different cause is identified. In some embodiments, the counter or counters are reset after a complete and error-free boot process. In some embodiments, the counter or counters are maintained until a remedial action that cures the cause associated with a particular counter is completed, at which point the particular counter is reset.

At 512, control circuitry 204 may be configured to detect, within a threshold period of time of the first reboot, a second reboot of the user device 100. For example, the threshold period of time may be five minutes. Thus, after a recorded reboot event at 10:30 AM, control circuitry 204 may detect a second reboot within a five-minute period after the first reboot event. Alternatively, the threshold period of time may by dynamically changed based on the identified cause of the first failure. For example, if the cause of the first failure is one of high severity, the threshold may be set at only two minutes, while less severe failures may result in the threshold being set at a longer interval.

At 514, control circuitry 204 may be configured to determine whether the second reboot was caused by a second failure of the monitored software process 106. This may be accomplished using methods similar to those described above with regard to determining that the first reboot was caused by the first failure of the software process 106.

At 516, control circuitry 204 may be configured to determine a cause of the second failure. This may be accomplished using methods similar to those described above in relation to determining the cause of the first failure.

At 518, control circuitry 204 may be configured to determine whether the cause of the second failure is the same as the cause of the first failure. For example, control circuitry 204 may compare the cause of the first failure with the cause of the second failure.

If control circuitry 204 determines that the cause of the second failure is the same as the cause of the first failure, then, at 520, control circuitry 204 may be configured to increment the counter associated with the cause of the failure.

At 522, control circuitry 204 may be configured to compare the counter to a failure threshold. At 524, control circuitry 204 may be configured to determine whether the counter exceeds the failure threshold. For example, the failure threshold may be set at five recorded failures that have caused reboot events. Control circuitry 204 may compare the counter, which represents the number of recorded failures causing reboot events, with the failure threshold. If control circuitry 204 determines that the counter exceeds the failure threshold, then, at 526, control circuitry 204 may be configured to determine that the user device 100 is experiencing a reboot loop.

At 528, control circuitry 204 may be configured to determine, based on the cause of the second failure, a remedial action. For example, if the cause of the failure is a lack of network connectivity, control circuitry 204 may determine to skip the step of the software process 106 that requires a network connection. At 530, control circuitry 204 may be configured to perform the remedial action. For example, control circuitry 204 may instruct user device 100 to skip the step of software process 106 that requires a network connection.

It is contemplated that the actions or descriptions of FIG. 5 may be used with any other embodiment of this disclosure. In addition, the actions and descriptions described in relation to FIG. 5 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-3 could be used to perform one or more of the actions in FIG. 5.

Figure 6:
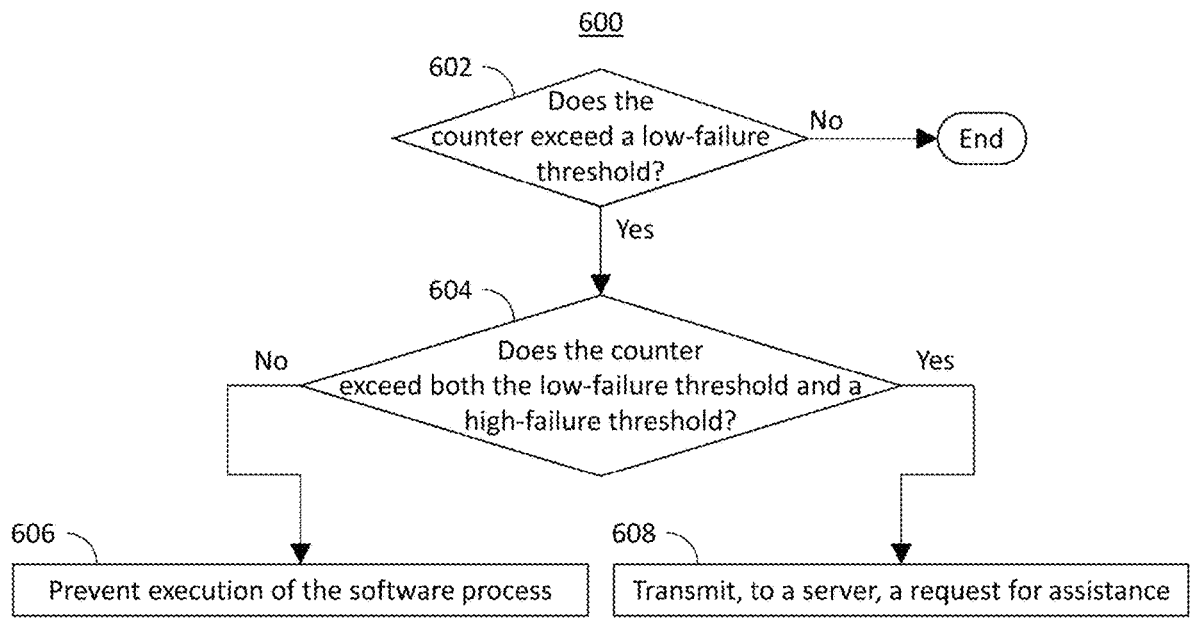
FIG. 6 is a flowchart representing a process for requesting assistance from a server as a remedial action in accordance with some embodiments of the disclosure.

FIG. 6 is a flowchart representing an illustrative process for requesting assistance from a server as a remedial action in accordance with some embodiments of the disclosure. The flowchart in FIG. 6 represents a process 600 implemented on control circuitry 204 for requesting assistance from a server as a remedial action according to an embodiment of the disclosure. It should be noted that process 600 or any action thereof could be performed on, or provided by, any of the devices shown in FIGS. 2-3. For example, process 600 may be executed by control circuitry 204 (FIG. 2) as instructed by a media guidance application implemented on a server (e.g., media content source 316 and/or media guidance data source 318 (FIG. 3)) in order to request assistance from a server as a remedial action. In addition, one or more actions of process 600 may be incorporated into or combined with one or more actions of any other process or embodiment described herein.

At 602, control circuitry 204 may be configured to determine if the counter exceeds a low-failure threshold. For example, the low-failure threshold may be three recorded failures that have caused reboot events. Control circuitry 204 may compare the counter to the low-failure threshold to determine if more than three failures have been recorded that have caused reboot events.

If the counter does exceed the low-failure threshold, then, at 604, control circuitry 204 may be configured to determine if the counter exceeds both the low-failure threshold and a high-failure threshold. For example, the high-failure threshold may be ten recorded failures that have caused reboot events. Control circuitry 204 may compare the counter with the high-failure threshold to determine if more than ten failures have been recorded that have caused reboot events.

If the counter exceeds the low-failure threshold, but does not exceed the high-failure threshold, then, at 606, control circuitry 204 may be configured to prevent execution of the failing software process (e.g., software process 106). For example, control circuitry 204 may access a process scheduler, batch file, or other configuration settings which may control the execution of various processes of the user device 100, and edit such settings to prevent the user device 100 from executing the software process 106.

If the counter exceeds both the low-failure threshold and the high-failure threshold, then, at 608, control circuitry 204 may be configured to transmit, to a server, a request for assistance. For example, control circuitry 204 may, using transceiver module 124, transmit, via communications network 314, a request 126 to a server, such as service provider 102, media content source 316, or media guidance data source 318, for assistance in correcting the cause of the failure.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-3 could be used to perform one or more of the actions in FIG. 6.

Figure 7:
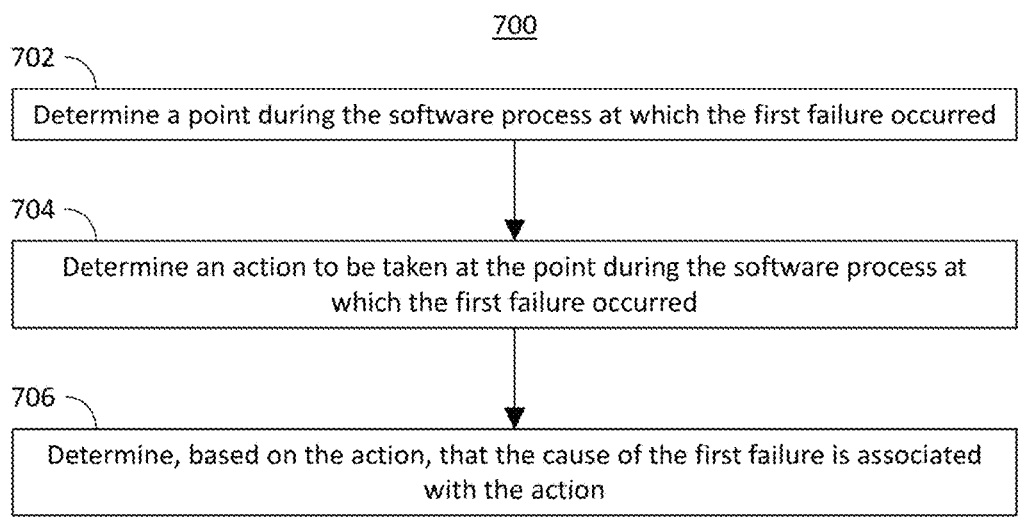
FIG. 7 is a flowchart representing a process for determining a cause of a software execution failure by analyzing an action taken at a point of failure in accordance with some embodiments of the disclosure.

FIG. 7 is a flowchart representing an illustrative process for determining a cause of a software execution failure by analyzing an action taken at a point of failure in accordance with some embodiments of the disclosure. The flowchart in FIG. 7 represents a process 700 implemented on control circuitry 204 for determining a cause of a software execution failure by analyzing an action taken at a point of failure according to an embodiment of the disclosure. It should be noted that process 700 or any action thereof could be performed on, or provided by, any of the devices shown in FIGS. 2-3. For example, process 700 may be executed by control circuitry 204 (FIG. 2) as instructed by a media guidance application implemented on a server (e.g., media content source 316 and/or media guidance data source 318 (FIG. 3)) in order to determine a cause of a software execution failure by analyzing an action taken at a point of failure. In addition, one or more actions of process 700 may be incorporated into or combined with one or more actions of any other process or embodiment described herein.

At 702, control circuitry 204 may be configured to determine a point during the software process 106 at which the first failure occurred. For example, control circuitry 204 may record a status signal at the completion of each step of the software process 106. If a failure occurs at a particular step, control circuitry 204 may access the recorded statuses to determine at which step the failure occurred.

At 704, control circuitry 204 may determine an action to be taken at the point during the software process 106 at which the first failure occurred. For example, at the step at which the failure occurred, the user device 100 may attempt to connect to a server. As another example, at the step at which the failure occurred, the user device 100 may attempt to process a data file.

At 706, control circuitry 204 may be configured to determine, based on the action, that the cause of the first failure is associated with the action. For example, control circuitry 204 may determine, based on the failure having occurred during an attempt to connect to a server, that the cause of the failure is that the user device 100 may not have a functional network connection. As another example, control circuitry 204 may determine, based on the failure having occurred during an attempt to process a data file, that the cause of the failure is that the data file is corrupt or otherwise does not conform to a required set of parameters for such data files.

It is contemplated that the actions or descriptions of FIG. 7 may be used with any other embodiment of this disclosure.

In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-3 could be used to perform one or more of the actions in FIG. 7.

Figure 8:
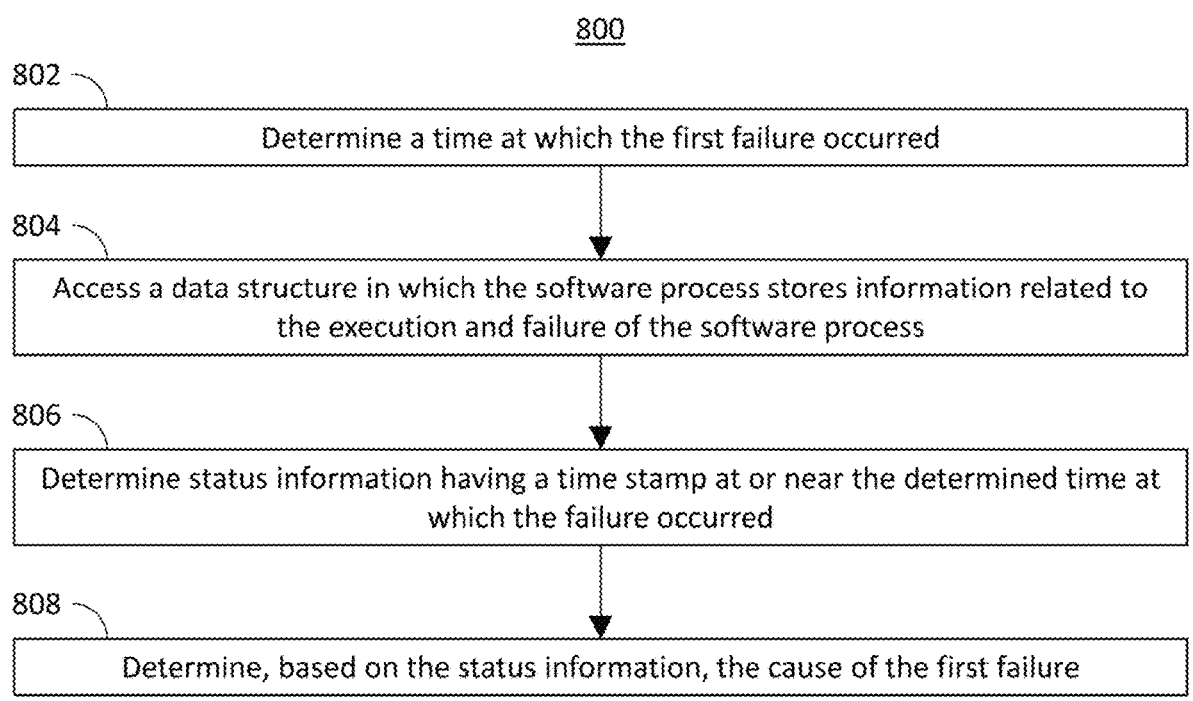
FIG. 8 is a flowchart representing another process for determining a cause of a software execution failure by comparing a time of a recorded failure with times of recorded process execution statuses in accordance with some embodiments of the disclosure.

FIG. 8 is a flowchart representing an illustrative process for determining a cause of a software execution failure by comparing a time of a recorded failure with times of recorded process execution statuses in accordance with some embodiments of the disclosure. The flowchart in FIG. 8 represents a process 800 implemented on control circuitry 204 for determining a cause of a software execution failure by comparing a time of a recorded failure with times of recorded process execution statuses according to an embodiment of the disclosure. It should be noted that process 800 or any action thereof could be performed on, or provided by, any of the devices shown in FIGS. 2-3. For example, process 800 may be executed by control circuitry 204 (FIG. 2) as instructed by a media guidance application implemented on a server (e.g., media content source 316 and/or media guidance data source 318 (FIG. 3)) in order to determine a cause of a software execution failure by comparing a time of a recorded failure with times of recorded process execution statuses. In addition, one or more actions of process 800 may be incorporated into or combined with one or more actions of any other process or embodiment described herein.

At 802, control circuitry 204 may be configured to determine a time at which the first failure occurred. For example, the software process 106 may store status information related to the execution and failure of the software process 106 in a data structure. The software process 106 may record statuses from each step of the software process 106 and store them in a list file, data file, database, or other data structure. Alternatively or additionally, the software process 106 may report such statuses to control circuitry 204, which may in turn store the statuses in, for example, memory 308.

At 804, control circuitry 204 may be configured to access a data structure in which the software process stores information related to the execution and failure of the software process 106. For example, control circuitry 204 may access a list, database, or other data structure containing a record of failures and associated timestamps indicating a time at which each failure occurred.

At 806, control circuitry 204 may be configured to determine status information having a timestamp at or near the determined time at which the failure occurred. For example, control circuitry 204 may access a data structure in which are recorded the status signals from each process, and which may also record a timestamp associated with each signal. Control circuitry 204 may compare the timestamp of the most recent failure with the timestamps of recent status signals indicating unsuccessful processes to determine which process may have been the cause of the failure.

At 808, control circuitry 204 may be configured to determine, based on the status information, the cause of the first failure. For example, control circuitry 204 may, in identifying status information having a timestamp at or near the timestamp of the failure, determine, based on the identified status information, the cause of the first failure.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-3 could be used to perform one or more of the actions in FIG. 8.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to anSpey other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for handling software execution failures on a user device, the method comprising:
   monitoring execution of a software process on the user device;
   detecting a reboot of the user device;
   determining whether the reboot was caused by a prerequisite process not having been completed; and
   in response to determining that the cause of the reboot is a prerequisite process not having been completed, slowing a speed at which the software process is executed to allow the prerequisite process to complete prior to execution of the software process.

2. The method of claim 1, further comprising:
   incrementing a counter; and
   determining whether the value of the counter exceeds a failure threshold;
   wherein slowing the speed at which the software process is executed occurs further in response to determining that the value of the counter exceeds the failure threshold.

3. The method of claim 2, wherein the counter is a reboot counter.

4. The method of claim 2, wherein the counter is one of a plurality of counters, each counter being associated with a respective cause of a reboot, and wherein incrementing the counter further comprises identifying a respective counter of the plurality of counters associated with the prerequisite process.

5. The method of claim 1, further comprising:
   detecting, within a threshold period of time after the reboot, a second reboot of the user device;
   determining whether the second reboot was also caused by the prerequisite process not having been completed.

6. The method of claim 5, further comprising:
   executing a limited boot process; and
   transmitting, to a server, a request for a software update.

7. The method of claim 1, wherein the software process comprises a plurality of steps, and wherein slowing the speed at which the software process is executed comprises pausing execution of the software process for a period of time after each step.

8. The method of claim 1, wherein the software process comprises a plurality of steps, the method further comprising:
identifying a step of the plurality of steps at which the reboot occurred; and
monitoring execution of the prerequisite process;
wherein slowing the speed at which the software process is executed comprises preventing execution of the identified step until the prerequisite process has been completed.

9. The method of claim 1, wherein the software process stores status information related to the execution and failure of the software process in a data structure.

10. The method of claim 9, wherein determining the cause of the reboot further comprises:
determining a time at which the reboot occurred;
accessing the data structure;
determining status information having a timestamp at or near the determined time at which the reboot occurred;
and determining, based on the status information, the cause of the reboot.

11. A system for handling software execution failures on a user device, the system comprising:
memory; and
control circuitry configured to:
monitor execution of a software process on the user device;
detect a reboot of the user device;
determine whether the reboot was caused by a prerequisite process not having been completed; and
in response to determining that the cause of the reboot is a prerequisite process not having been completed, slow a speed at which the software process is executed to allow the prerequisite process to complete prior to execution of the software process.

12. The system of claim 11, wherein the control circuitry is further configured to:
increment a counter; and
determine whether the value of the counter exceeds a failure threshold;
slow the speed at which the software process in response to determining that the value of the counter exceeds the failure threshold.

13. The system of claim 12, wherein the counter is a reboot counter.

14. The system of claim 12, wherein the counter is one of a plurality of counters, each counter being associated with a respective cause of a reboot, and wherein the control circuitry configured to increment the counter is further configured to identify a respective counter of the plurality of counters associated with the prerequisite process.

15. The system of claim 11, wherein the control circuitry is further configured to:
detect, within a threshold period of time after the reboot, a second reboot of the user device;
determine whether the second reboot was also caused by the prerequisite process not having been completed.

16. The system of claim 15, wherein the control circuitry is further configured to:
execute a limited boot process; and
transmit, to a server, a request for a software update.

17. The system of claim 15, wherein the software process comprises a plurality of steps, and wherein the control circuitry configured to slow the speed at which the software process is executed is further configured to pause execution of the software process for a period of time after each step.

18. The system of claim 15, wherein the software process comprises a plurality of steps, and wherein the control circuitry is further configured to:
identify a step of the plurality of steps at which the reboot occurred;
monitor execution of the prerequisite process; and
slow the speed at which the software process is executed by preventing execution of the identified step until the prerequisite process has been completed.

19. The system of claim 15, wherein the software process stores, in the memory, status information related to the execution and failure of the software process in a data structure.

20. The system of claim 19, wherein the control circuitry configured to determine the cause of the reboot is further configured to:
determine a time at which the reboot occurred;
access, from the memory, the data structure;
determine status information having a timestamp at or near the determined time at which the reboot occurred;
and determine, based on the status information, the cause of the reboot.

* * * * *